May 2, 1944. W. H. GREEN 2,348,125
SEWAGE TREATMENT
Filed July 24, 1941 2 Sheets-Sheet 1
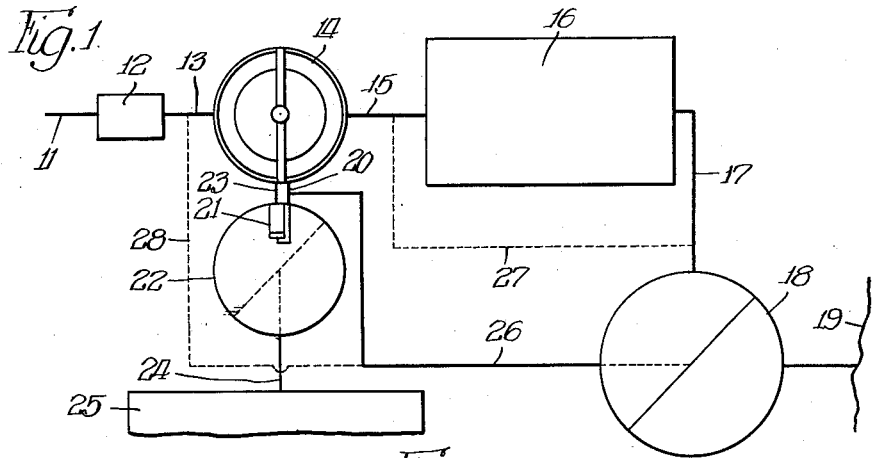
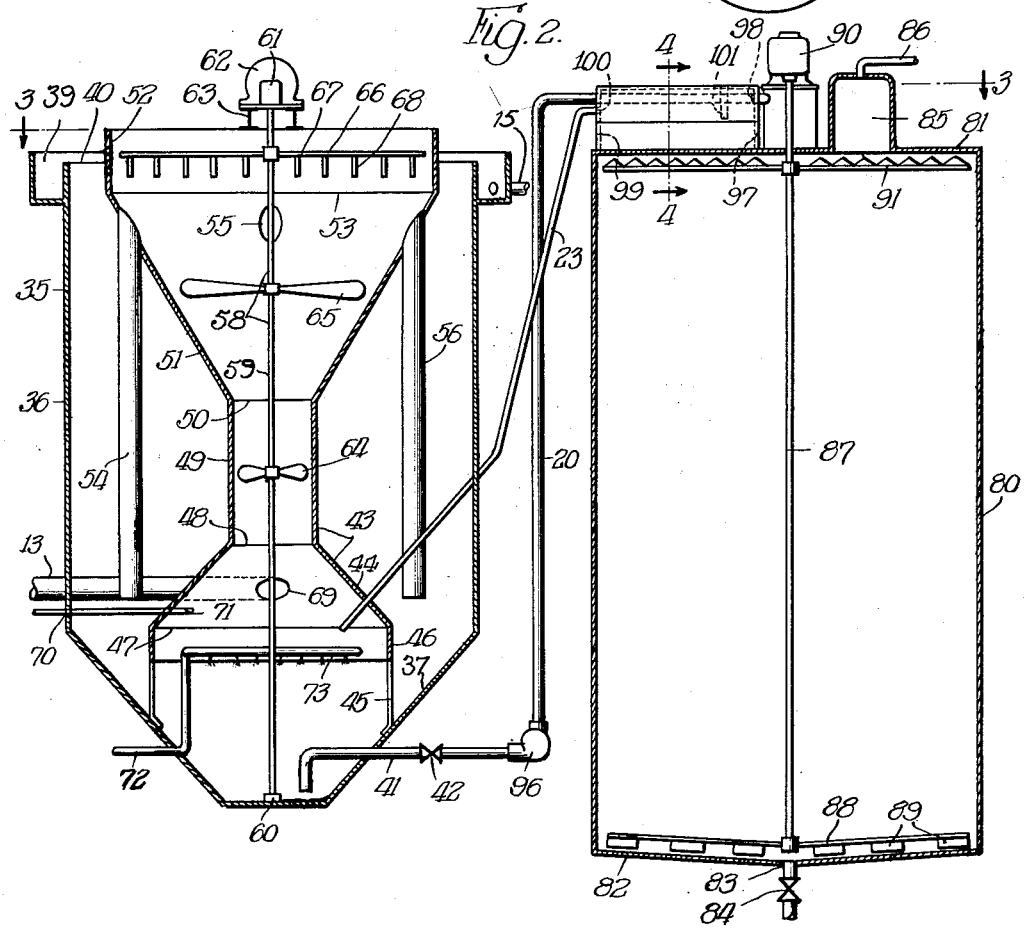
INVENTOR.
Walter H. Green,
BY Robyn Wilcox
Atty.

May 2, 1944. W. H. GREEN 2,348,125
SEWAGE TREATMENT
Filed July 24, 1941 2 Sheets-Sheet 2

INVENTOR.
Walter H. Green,
BY

Patented May 2, 1944

2,348,125

UNITED STATES PATENT OFFICE 2,348,125

SEWAGE TREATMENT

Walter H. Green, Chicago, Ill., assignor to Infilco Incorporated, a corporation of Delaware Application July 24, 1941, Serial No. 403,862

13 Claims. (Cl. 210—2)

This invention relates to an improvement in sewage treatment and particularly to the effective separation and disposal of solids therefrom.

An object of the invention is to provide an improved method and apparatus for removing solids from sewage.

A still further object of the invention is to provide apparatus for the removal from sewage of the solids contained therein and for the disposal of such removed solids.

Another object of the invention is to provide an improved apparatus for the clarification of sewage and for the digestion of the solids removed by such clarification.

Another object is to provide for the further concentration or dewatering of the solids separated from sewage in a previous step to the end that they may be disposed of more readily.

A particular object is to provide a method and means whereby solids or sludge already separated from a flow of sewage may be subjected to a second concentrating or dewatering step in a way such that the solids are readily deposited in or delivered into a digester, whereby a reduction in the volume or size of such digester is secured, while at the same time the liquid separated in this step and liquid displaced from the digester by entering solids is returned back to a prior step for further treatment.

Other objects of the invention will be apparent from the description and claims which follow.

The purification of sewage involves many difficult problems. Sewage contains a large amount of colloidal and light suspended organic particles which settle slowly, and which putrify readily. It is, therefore, necessary to carefully control conditions in a sewage purification plant in order to separate the solids from the sewage and to avoid the development of septicity in the sewage undergoing treatment. Whenever the settled solids or the clarified liquid are permitted to stand dormant for more than a very short time, anaerobic or septic conditions arise in any portion remote from the atmosphere and such septic conditions are objectionable in and of themselves and from the effect on subsequent steps.

Another of the steps in sewage treatment is the digestion of the solids separated from the sewage liquor. At one time the well-known Imhoff tanks were widely used for combined clarification and digestion. In effect they are a digestion tank with a clarification chamber extending across the top, the clarification chamber being provided with steeply sloping bottom with an open communication into the digestion tank so that solids could settle directly into the digester. In this type of apparatus all the raw sewage flows through the clarification chamber and the solids settle therefrom, passing from that chamber into the digester below. Recent practice has preferred the use of separate circular or rectangular clarification tanks which desirably provide a holding time of about two hours. During this period, taken by the slow flow of sewage from the inlet to the outlet, a portion, usually about half, of the solids suspended in the sewage deposit on the floor as sludge. The effluent is then usually subjected to biological treatment in order to achieve a purification which will permit its disposal into some water course.

The solids are ordinarily scraped from the bottom of the clarification tank and pumped as a sludge containing about 5 per cent solids and 95 per cent water into a digester. Obviously, the size of the digester is determined by the volume of the sludge delivered into it and, as such digesters are comparatively large at best and correspondingly costly to build, I now propose to effect some reduction in size thereof by a dewatering step between the clarifier and the digester, as will be explained more fully hereafter.

One aspect of my invention is to provide an improved clarifier for raw sewage, with which is associated an improved means for removing the sludge from the apparatus. Another aspect of my invention is to provide an improved means for introducing the sludge into the digester and for a further treatment of the digester supernatant.

Not only do I propose an improved way of handling sewage sludge and apparatus therefor but in my preferred form I propose also and in combination therewith improved method and means of clarification, the two cooperating as to the complete final result.

In my copending application, Serial No. 403,861, I show an improved method and apparatus for sewage clarification. The process and apparatus of that application is particularly advantageous as the primary step of the present invention, partly because of the shortening of time thereby, partly because of the overcoming of septic tendency, partly also because of the better form or nature of the sludge formed thereby, partly also because a greater degree of clarification may be had and there may also advantageously be had a continuous flow or delivery of sludge or solids from the first step to the next. My invention will be described in connection with a clarifier of this type but it is to be understood that this is for purposes of illustration only and that any suitable type of clarifier may be used as conditions permit and such use is contemplated.

Briefly, my invention comprises a first concentration of the solids to a considerable degree, preferably to form a concentrated slurry of unsedimented solids which assists in the separation of further solids and liquid. These solids are removed with some liquid to a quiescent chamber, which may be associated with a digester, wherein solid particles subside, and liquid, which may still contain some solids, is returned to the first concentration zone. In this manner the solids are quickly separated from the water to form the slurry, the slurry particles rapidly settle in the quiescent chamber, and the clarified or partly clarified liquid returns to the first step before septic conditions have an opportunity to develop. By means of my rapid treatment and my improved removal of solids, size and cost of equipment is less and greatly improved conditions are possible throughout the entire sewage treating plant.

A preferred embodiment of the present invention is shown in the accompanying drawings which form a part of this specification and in which like reference characters in the several figures designate similar elements.

Figure 1 is a diagrammatic plan view of a sewage treatment plant embodying the present invention.

Figure 2 is a vertical cross-sectional view of the sewage clarifier and digester of the present invention.

Figure 3:
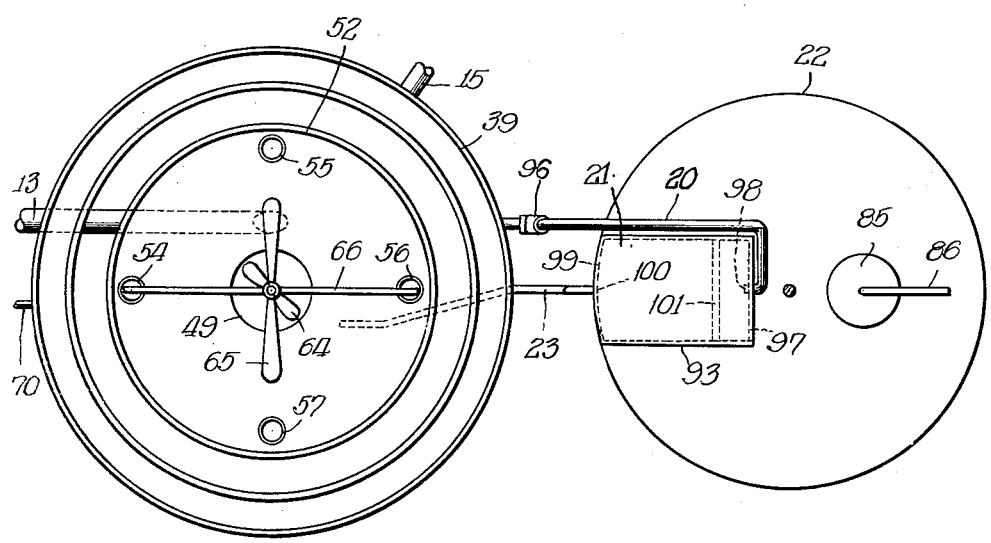
Figure 3 is a plan view of the apparatus shown in Figure 2.

Figure 1 shows a sewage treatment plant in which the apparatus of the present invention is utilized. Most of the elements shown therein are well known to the art and need not be described in detail. Raw sewage flows through a sewer 11 into a grit removal chamber 12, where heavy inorganic solids, such as gravel, are removed. From the grit removal chamber the sewage flows through a conduit 13 into a clarifier 14. In the clarifier the liquid and a major portion of the solids are separated, clarified sewage flowing through a clarified sewage conduit 15 to and through a biological treating device 16 which may be in the nature of an activated sludge plant, a trickling filter, or any other means adapted to render the sewage liquid inoffensive and suitable for discharge to waste. In most cases, the liquid after undergoing treatment in the biological treating device is conducted through a conduit 17 to a secondary clarifier 18, where the solids still remaining in the sewage are settled. In some cases the secondary clarifier 18 is unnecessary and the sewage can flow directly from the secondary treating device into a water course 19 for disposal. The solids separated from the sewage in the clarifier 14 are conducted as a sludge by a conduit 20 into a small pocket or chamber 21 at the top of a digester 22, from which they settle into the digester. Supernatant liquid from the digester, displaced by the entering solids, together with the liquid contents of the sludge, flows through a conduit 23 back into the clarifier. Digested sludge is withdrawn from the bottom of the digester through a sludge conduit 24 and may be discharged onto sludge drying beds 25 or otherwise disposed of. Sludge may be discharged from the secondary clarifier into the digester 22 through a sludge line 26, which can connect with the slurry line 20, from the primary clarifier to the solids receiving and separating chamber 21.

In some types of sewage plants, particularly when the biological treatment apparatus 16 is a trickling filter, it is desirable, as disclosed by the Patent to Shook, No. 2,097,779, to return to the biological treatment apparatus 16 all or a portion of the effluent therefrom; such return can be secured by means of an effluent return line 27. In some installations it may be preferred to return sludge from the secondary clarifier 18 to the primary clarifier 14 as by a sludge line 28, instead of to the slurry line 20.

Figures 2 and 3 disclose an enlarged vertical cross-sectional view and an enlarged plan view of the clarifier and digester shown in Figure 1. The clarifier 14 is similar to that described in my above mentioned invention and, briefly, comprises a suitable tank, such as a cylindrical tank 35 formed by the vertical wall 36 with hopper bottom 37. This construction prevents the accumulation of sludge in stagnant corners where it would rapidly become septic if permitted to collect away from air. The clarified sewage effluent 15 is connected to an effluent launder 39, which is located adjacent the top 40 of the tank 35. A slurry outlet 41 leads from the bottom of the tank 35 and is provided with a valve 42 in order to control flow therethrough.

Within the tank 35 I place a partition 43 for confining a mixing and circulating zone. There is also shown a mechanical impeller for producing a circulation of considerable volume and velocity through the circulating zone, and to maintain the solids contained in the sewage in suspension. Various arrangements of the partition, or baffle, and impeller will be obvious to those skilled in the art, but I have used and prefer an arrangement such as illustrated in the drawings. The preferred arrangement consists of a conical hood 44 in spaced relationship from the bottom 37 of the tank and supported by any suitable means, such as legs 45. A vertical skirt 46 may be attached to the lower rim 47 of the hood. The upper portion of the hood is open, as at 48, and communicates with an intermediate vertical cylinder 49. The vertical cylinder 49, at its upper end 50, communicates with an upwardly expanding or inverted conical chamber 51. The wall of the chamber 51 should extend above the liquid level in the apparatus as it is very desirable that the liquid being mixed and circulated through this chamber be prevented from overflowing into the upper portion of the tank 35. Therefore, in those installations in which the size and shape of the tank 35 makes it desirable to do so I may provide a short vertical cylinder 52 at the upper rim 53 of the upwardly expanding chamber 51, in order to raise the chamber wall above the liquid level of the apparatus without approaching too closely to the outer rim 40 of the tank. I further provide a plurality of vertical draft tubes, such as 54, 55, 56, and 57, leading from adjacent the upper portion of the upwardly expanding chamber 51 down to the lower portion of the tank.

Coaxially aligned within the partition 43 I place a mixing and agitating apparatus 58, which may be of any suitable arrangement. Briefly, it may comprise a shaft 59, the lower end of which is journaled in a bearing 60, located in the bottom part of the tank. The upper end of the shaft 59 is attached to reducing gears 61 which in turn are driven by a motor 62. The reducer and motor should be placed above the liquid level in the apparatus and can be supported by any suitable means, such as a bridge 63. Affixed to the shaft 59 are impellers and agitators to provide a turbulent mixing within the partition 43 and a circulation therethrough, and through the down draft tubes, of relatively high volume and velocity. For this purpose I prefer to place an impeller 64 rigidly affixed to the shaft 59, within the intermediate cylinder 49, which provides communication between the hood 44 and the upwardly expanding chamber 51. I also prefer to place a larger impeller 65, also rigidly affixed to the shaft 59, within the upwardly expanding chamber 51. At the liquid level in the apparatus I prefer to have a rake 66 for agitating the surface of the liquid in the upwardly expanding chamber 51. This stirs air into the surface of the circulating sewage and increases the absorption thereof. With or without the rake 66, air is absorbed by the circulating sewage and carried into the lower portion of the tank. In this way and also due to the repeated and rapid circulation, aerobic conditions are maintained throughout the volume of sewage. The rake 66 may be of any suitable construction, such as a horizontal bar 67 rigidly affixed to the shaft 59 and with a plurality of teeth 68 extending down into the liquid.

The raw sewage influent 13 is shown discharging into the space enclosed by the hood 44, as at 69. A chemical feed line 70 likewise may discharge into the space enclosed by the hood, as at 71. In some installations it may be desirable to provide means, such as an air line 72, provided with suitable diffusers, such as nozzles 73 for the forced aeration of sewage in the lower portion of the tank and supplied with compressed air by any suitable means, not shown. I have found in actual operation that in ordinary domestic sewages such aeration is not necessary if turbulent agitation and a high rate of circulation is maintained as above described.

The operation of the apparatus will be readily understood. Raw sewage enters through the line 13 and reagent, if used, through the line 70. The impellers are of such size and are turned by the motor 62 at such speed as to cause a rate of circulation of sewage through the mixing and circulating space and in the lower part of the tank substantially greater, desirably at least twice greater than the rate of raw sewage entry, and sufficient to maintain solids in suspension therein and to prevent deposit thereof from sewage in the tank. A portion of sewage equal to the rate of raw sewage input will be displaced upwardly after discharge from the downdraft pipes, 54, 55, 56 and 57, and will escape over the edge 40 of the launder 39. Solids are retained and will accumulate in the circulation to form a concentrate or slurry of a character such that the sewage rising from the lower end of the pipes, 54, 55, 56 and 57, will clarify on reaching, or will emerge clarified from, the upper surface of the slurry, to be discharged in clarified condition. The solids are retained or accumulated in the circulating slurry until this reaches a desired degree of concentration suitable to the process, after which such solids are removed by flow through a pipe 41 to a chamber 21 as hereafter referred to.

This form of clarifier is particularly advantageous, because of its smaller size, the more complete clarification obtained, the aerobic conditions maintained therein, the better character of sludge obtained, etc., but, as noted elsewhere, other forms may be used.

Adjacent the sewage clarifier 14 is a digester 22. The digester 22 comprises a tank 80, provided with a tightly fitting roof 81 and a sloping floor 82. A drain 83 leads from the lower portion of the floor 82 and is used for the removal of digested sludge. A valve 84 in the drain 83 controls the operation of the digested sludge removal. The digester is further provided with a gas dome 85 for collecting gas resulting from digestion. Preferably, the gas dome 85 will be higher than the liquid level of the solids receiving chamber 21, in order to prevent the possibility of sewage getting into the gas removal line 86, leading from the gas dome 85. Also, within the digester is a sludge scraper mechanism which comprises a shaft 87 extending throughout the height of the tank, the lower end of which is provided with arms 88 to which are affixed scraper blades 89 for gently pushing sludge toward the drain 83. The scraping mechanism is rotated slowly by any suitable means, such as a motor 90. Also rigidly affixed to the scraper shaft 87, is a scum mover or rake 91.

Figure 4:
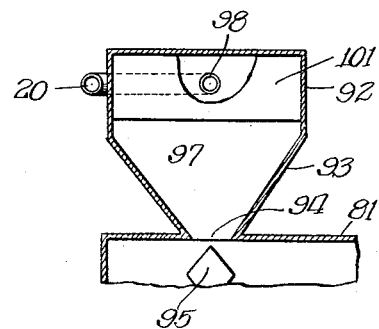
Figure 4 is an enlarged detail of the solids separator above the digester, taken along the vertical plane 4—4 of Figure 2.

In the preferred form of my embodiment I place a sludge receiving and separating chamber 21 adjacent the upper portion of the digester. An enlarged cross-sectional view of such a chamber is shown in Figure 4. It is preferably placed on the roof 81 of the digester and comprises side walls 92 and a steeply sloping bottom 93. The lower portion of the bottom is cut away to form a constantly open communication 94 between the chamber or pocket 21 and the top of the digester. Preferably, a baffle means 95 is placed below the constantly open communication 94 to cause sewage gas rising in the digester to be directed to the gas chamber 85.

The slurry withdrawal line 41 from the clarifier 14, is connected to the inlet side of a pump 96. A conduit 20 leads from the outlet of the pump 96 into the solids receiving chamber 21 on the digester 22. Preferably, the conduit 20 will enter the solids receiving chamber 21, adjacent one end thereof, such as at 97, and preferably at the top of the chamber, as at 98. From the other end 99 of the solids separating chamber, as at 100, a liquid return conduit 23 leads to the lower portion of the clarifier 14, as within the space enclosed by the hood 44. Preferably, a vertical baffle 101 will be interposed between the inlet 98 and the outlet 100, to prevent short circuiting of flow through the chamber 21. In some instances, it may be desirable to aerate slurry passing from the clarifier 14 to the solids receiving chamber 21. If so, this can be done by any suitable aeration means, not shown, placed in the slurry withdrawal line 41 or the slurry conduit 20.

As the slurry slowly flows through the chamber 21, solids will deposit therefrom into the digester 22, and a volume of supernatant liquor will be displaced from the digestor into the chamber 21. This supernatant, together with the more or less clarified liquid from the slurry, is returned through the return liquid conduit 23 into the circulation in the central part of the clarifier where it is mixed and subjected to further treatment with the contents thereof.

The operation of the apparatus above described in quite simple. At the beginning of the operation sewage is introduced through inlet 13 into the clarifier and clarified effluent is withdrawn therefrom through outlet 15. In the preferred form of the clarifier shown, the sewage is introduced into the mixing chamber formed by partition 43 and is rapidly and rather turbulently circulated upwardly through the mixing zone to the surface of the liquid. The rake 66 stirs the surface of the circulating liquid so as to cause some aeration of the circulated sewage and prevent formation of scum. The sewage then passes down to the bottom of the tank through the conduits 54, 55, 56, and 57 and is discharged in the lower portion of the tank where it is again picked up and circulated through the mixing zone by the impellers 64 and 65 which rotate rapidly. During the passage of the sewage through the mixing zone a chemical may be added to flocculate sewage particles; however, chemicals are not always necessary as with some types of sewage the rapid circulation alone is sufficient to cause aggregation of the fine suspended particles in the sewage into large, rather dense particles. The particles, however formed, are retained in the clarifier to form a slurry. It is preferred that the entering raw sewage be mixed with a volume of slurry at least four times that of the raw sewage. With a clarifier of this type, clarified liquid is squeezed out of the upper surface of the slurry, which preferably will be maintained at a level somewhere between the top and bottom of the restricted cylindrical wall 49 of the mixing chamber. Clarified sewage will be continuously withdrawn through the outer annular portion of the clarifier into launder 39 and effluent conduit 15.

Regardless of the type of clarifier used the slurry or sludge in the lower portion of the clarifier will be withdrawn continuously, or substantially so, through conduit 41 and passed into the solids concentrating chamber 21. It is preferred that the solids concentrating chamber 21 be so arranged that the slurry or sludge will enter at one end and the liquid passed slowly through the chamber and be withdrawn at the other. As indicated above, as the sludge or slurry passes slowly through the chamber, solids will deposit into the digester 22 and more or less clarified liquid be withdrawn from the concentrator and discharged into the clarifier preferably somewhere adjacent the raw sewage inlet. The clarified liquid from the solids concentrator will thereupon pass through the clarifier along with newly entering sewage. In view of the fact that the flow of slurry or sludge from the clarifier to the concentrating chamber and the return of clarified liquid from the latter to the clarifier is continuous, the rate of flow will be relatively small. This permits a slow flow through the concentrating chamber 21 which will permit deposit of substantially all of the solids therefrom. Such a slow and continuous flow provides that the volume of supernatant liquor displaced from the digester into the concentrator, and thence returned to the clarifier, will always be relatively small, which will prevent such liquor from interfering with the economical operation of the clarifier.

As used herein, the term "continuous" includes not only an uninterrupted flow but also an intermittent flow at such frequent periods that the effect is that of a substantially continuous flow. In many installations a literally continuous flow would be too small to be economical so that it would be better to have a large number of larger intermittent flows at frequent intervals. For example, in some instances I have found that it is more practical to withdraw partially thickened sludge at five or ten minute intervals for periods of thirty to sixty seconds each. As contrasted with sludge withdrawals of once or twice a day, such frequent withdrawals can properly be classed as "continuous," and the term is used in the specification and claims in this sense.

This combination with a clarifier and a digester of an intermediate chamber is advantageous in itself and particularly so when, as herein shown, this chamber is at least partly above the top of the digester. In and of itself it permits a further concentration of solids and so a lesser volume thereof entering the digester. When the liquid level in this chamber is above the top of the digester and the two are in open communication, obviously, the digester will be always completely filled with liquid and this prohibits the entry of air thereinto which tends to form an explosive mixture with the methane gas which is formed in the digester, and this will be true whether the flow into the chamber 21 is continuous or intermittent. Heretofore, it has been common practice to discharge sludge into such digester intermittently, and, whether intermittently or not, to allow the displaced liquor to escape without clarification. Also, it is necessary to withdraw periodically digested sludge from the digester. When this is done without simultaneous entry of an equal volume, as I now provide, air will be drawn to form the objectionable air-methane mixture. To meet this, so called "floating covers" have been provided for such digesters but these are costly and otherwise objectionable. Thus, my intermediate concentrating or separating chamber is not only advantageous from the aspect of the further concentration of solids but also provides other advantages.

Further, it will be apparent that both the clarification chamber 14 and the solids receiving chamber 21, act to separate liquid from entrained solids and to thicken the solids so separated. This is, of course, particularly true if the clarifier 14 is of a type disclosed in my copending invention. The use of two liquid separation and solids thickening chambers permits a reduction in the size of the digester, with a consequent saving in initial cost and in operation.

Manifestly, many modifications and variations of the invention hereinbefore set forth may be made by persons skilled in the art without departing from the spirit and scope hereof. Accordingly, the appended claims are to be given an interpretation commensurate with the novelty herein described and as broad as may be permitted by prior art.

I claim:

1. Sewage treating apparatus comprising a clarifier, a raw sewage inlet into said clarifier, a clarified sewage outlet from said clarifier, a sludge digester, a solids concentrating chamber in open communication from its lower portion with the upper portion of said digester, means including a conduit leading from the lower part of said clarifier and discharging into said solids concentrating chamber whereby sludge may be delivered from the former into the latter, a liquid outlet from the upper part of said concentrating chamber, a liquid return conduit leading from said upper outlet to said clarifier, said outlet and said return conduit being so disposed as to determine the normal liquid level in said digester, and a digested sludge outlet from the lower portion of said digester.

2. Sewage treating apparatus comprising a relatively large clarifier, a relatively large sludge digester, a gas outlet from said digester, a relatively small solids concentrating chamber at the top of said digester, a raw sewage inlet into said clarifier, a clarified sewage outlet from said clarifier, a sludge conduit from said clarifier to said solids concentrating chamber, outlet means including a liquid return conduit leading from a level in said solids concentrating chamber below the level of the gas outlet and discharging in said clarifier, and a constantly open communication between the lower portion of said solids concentrating chamber and said digester affording egress for solids from the concentrator into the digester and ingress of supernatant into the concentrator from the digester.

3. The apparatus of claim 2 comprising also means including a prime mover and a mechanical stream projecting impeller positioned to cause a turbulent circulation of sewage in said clarifier, and partition means within said clarifier positioned to limit and guide said circulation of sewage in a path beginning in and returning to the lower portion of said clarifier.

4. The apparatus of claim 2 wherein the solids concentrating chamber comprises a basin, the sludge conduit from the clarifier discharges into, and the liquid return conduit leading to the clarifier discharges from, spaced points in the upper portion of said basin and wherein a deflecting baffle adapted to direct the flow from said sludge conduit downwardly is interposed in said basin between said spaced points.

5. The apparatus of claim 2 wherein the solids concentrating chamber comprises a rectangular basin, the sludge conduit from the clarifier discharges into one end thereof, and wherein the liquid return conduit to the clarifier leads from the opposite end of said basin.

6. Sewage treating apparatus comprising a clarification tank, partition means within said tank dividing the same into a mixing zone extending from and back into the lower portion of the tank and a quiescent zone in an upper portion thereof, a mechanical stream projecting impeller within said mixing zone so constructed and arranged as, on operation thereof, to cause turbulent circulation of sewage therethrough, means for driving said impeller, inlet means for delivering raw sewage and a chemical reagent into said mixing zone, an outlet for clarified sewage from the upper portion of said quiescent zone, a digestion tank adjacent to said clarification tank, a cover on said digestion tank, a solids concentration chamber adjacent the upper level of said digestion tank, a constantly open communication between the lower portion of said solids concentrating chamber and said digestion tank, means including a conduit for continuously discharging sludge from said clarification tank into said solids concentration chamber, and a conduit discharging into the mixing zone in the clarification tank and leading from a level in said solids concentration chamber below the level of the uppermost portion of the cover of the digestion tank whereby the liquid level of the digester is controlled by the level of said conduit.

7. The apparatus of claim 6 having separate inlet means for raw sewage and for chemical reagent, said inlet means discharging at spaced points in said mixing zone.

8. The apparatus of claim 6 containing in addition means for mixing air with the circulating sewage.

9. A sewage treatment process which comprises the steps of first separating suspended solids from said sewage by a method which includes the steps of maintaining a pool of slurry containing solids separated and accumulated from previously clarified sewage in the lower portion of a body of said sewage, continuously circulating slurry from the lower portion of such pool of slurry through a mixing zone and returning the same to the lower portion of said pool, applying substantial mechanical propelling energy to said slurry to produce said circulation and to produce turbulence in said circulating slurry sufficient to maintain in suspension the solid particles therein, mixing together in said mixing zone incoming raw sewage with a greater amount of slurry, aerating said circulating sewage and slurry, displacing an output quantity of clarified sewage liquor from said slurry, and withdrawing said clarified sewage liquor from the upper portion of said body of sewage; then continuously passing a minor flow of slurry from the pool of slurry into a quiescent zone outside of said body of sewage, separating solids from liquid in said quiescent zone, continuously discharging the solids by gravity into a subjacent digestion zone and thereby displacing an equal amount of supernatant liquor from the upper portion of said digestion zone into said quiescent zone, and finally returning the liquid from the quiescent zone into the mixing zone.

10. In the treatment of sewage by a process which includes the separation of solids from the sewage and the subsequent digestion of the separated solids, the steps which comprise establishing a pool of concentrated slurry of suspended particles separated and accumulated from previously treated sewage, circulating slurry from the lower portion of said slurry pool upwardly through a vertical mixing zone and returning the same downwardly, mixing together in said mixing zone incoming raw sewage with a greater amount of slurry, applying substantial mechanical propelling energy to said slurry in said vertical mixing zone to maintain said circulation and to maintain the particles in said slurry in suspension, aerating said circulating sewage and slurry, displacing clarified sewage liquor out of said slurry, withdrawing said displaced clarified sewage liquor, removing solids from said slurry to control the amount thereof by continuously flowing mixed liquid and solids from said slurry into a separated quiescent sedimentation zone, permitting the solids to continuously settle by gravity from said sedimentation zone into a subjacent digestion zone and simultaneously displacing an equal amount of supernatant liquor from the upper portion of said digestion zone into said sedimentation zone, and continuously returning liquid from the upper portion of said sedimentation zone into the slurry pool.

11. In the process of treating sewage which includes the steps of first passing raw sewage through a clarifying zone wherein solids may separate from the liquid and deposit, the withdrawal of clarified sewage from the clarifying zone and the removal of solids from said clarifying zone to a digestion zone, the improvement which comprises continuously passing a small flow of sewage containing partially thickened solids from the lower portion of said clarifying zone into a relatively small quiescent zone superposed above the digestion zone, separating solids from liquid in said quiescent zone, continuously passing said separated solids into said digestion zone by gravity and thereby simultaneously displacing an equal amount of supernatant liquor from said digestion zone into said quiescent zone, and continuously returning at least partially clarified liquid from the upper portion of said quiescent zone to said clarifying zone.

12. In sewage treating apparatus which includes a relatively large raw sewage clarifier, a raw sewage inlet into said clarifier, a clarified sewage outlet from said clarifier, a sewage digester, a gas outlet from the top of said digester, means for transferring sludge from the lower part of said clarifier into said digester and a sludge outlet from said digester, improved means for thickening sludge being transferred from the clarifier to the digester and simultaneously disposing of digester supernatant which comprises a relatively small solids concentrating chamber superposed above the upper portion of said digester, a constantly open communication between the lower portion of said solids concentrating chamber and said digester, means including a conduit for delivering solids from the lower part of said clarifier into said solids concentrating chamber, a liquid return conduit leading from a level in said concentrating chamber below the level of said gas outlet and discharging into the inlet portion of said clarifier and means for providing a continuous flow of sludge through said conduit for delivering solids from the lower portion of said clarifier to said solids concentrating chamber.

13. Sewage treatment apparatus comprising a primary sewage clarifier and sludge thickener apparatus, said primary apparatus having an inlet for sewage to be clarified, an outlet for clarified sewage, and a sludge outlet, a sludge digester, and improved means to deliver sludge from said primary apparatus into said digester, said means including a solids concentrating chamber superposed upon said digester, a sludge conduit leading from said sludge outlet to said solids concentrating chamber, an effluent conduit normally open to flow therethrough leading from a level in said solids concentrating chamber below the level of the uppermost part of said digester and discharging into said primary clarifier apparatus, and a normally open communication between the lower part of said solids concentrating chamber and said digester through which solids may descend by gravity into said digester to be digested therein and liquid rise from said digester into said solids concentrating chamber to be clarified therein.

WALTER H. GREEN.